(12) United States Patent
Harmstorf

(10) Patent No.: US 12,523,447 B2
(45) Date of Patent: Jan. 13, 2026

(54) DEVICE, METHOD AND VEHICLE

(71) Applicant: Rheinmetall Electronics GmbH, Bremen (DE)

(72) Inventor: Johann Harmstorf, Ganderkesee (DE)

(73) Assignee: Rheinmetall Electronics GmbH, Bremen (DE)

( * ) Notice: Subject to any disclaimer, the term of this patent is extended or adjusted under 35 U.S.C. 154(b) by 0 days.

(21) Appl. No.: 18/287,580

(22) PCT Filed: Apr. 13, 2022

(86) PCT No.: PCT/EP2022/059914
§ 371 (c)(1),
(2) Date: Oct. 19, 2023

(87) PCT Pub. No.: WO2022/223407
PCT Pub. Date: Oct. 27, 2022

(65) Prior Publication Data
US 2024/0219149 A1 Jul. 4, 2024

(30) Foreign Application Priority Data
Apr. 21, 2021 (DE) .................. 10 2021 110 169.7

(51) Int. Cl.
*F41G 3/14* (2006.01)
*F41J 5/06* (2006.01)
(Continued)

(52) U.S. Cl.
CPC ............... *F41G 3/147* (2013.01); *F41J 5/06* (2013.01); *G01S 3/8083* (2013.01); *G01S 5/18* (2013.01); *G01S 2205/07* (2020.05)

(58) Field of Classification Search
CPC ...... F41G 9/00; F41G 3/147; F41J 5/06; F41J 5/08; F41H 13/00; G01S 3/8083; G01S 5/18
See application file for complete search history.

(56) References Cited

U.S. PATENT DOCUMENTS

| 5,970,024 | A | 10/1999 | Smith | |
|---|---|---|---|---|
| 9,081,409 | B2 * | 7/2015 | Soles | F41H 7/02 |
| 2006/0053534 | A1 * | 3/2006 | Mullen | F41H 7/005 |
| | | | | 2/456 |

FOREIGN PATENT DOCUMENTS

| DE | 10136981 A1 | 2/2003 |
|---|---|---|
| EP | 1450125 A1 | 8/2004 |

(Continued)

OTHER PUBLICATIONS

Borzino, A. et al., "Gunshot signal enhancement for DOA estimation and weapon recognition," Proceedings of European Signal Processing Conference, Sep. 1, 2014, Lisbon, Portugal, 5 pages.
(Continued)

*Primary Examiner* — J. Woodrow Eldred
(74) *Attorney, Agent, or Firm* — Alleman Hall & Tuttle LLP

(57) ABSTRACT

A device for determining a firing position from which a projectile has been fired at a target object is proposed, comprising:
  at least one sensor unit for detecting an impact of the projectile in the target object,
  at least one acoustic sensor unit for detecting a muzzle blast when the projectile is fired, and
  a determination unit which is arranged to determine the firing position on the basis of the detected muzzle blast and the detected impact.

19 Claims, 2 Drawing Sheets

(51) Int. Cl.
    *G01S 3/808* (2006.01)
    *G01S 5/18* (2006.01)

(56) References Cited

FOREIGN PATENT DOCUMENTS

| EP | 2051095 A1 | 4/2009 |
| EP | 2793043 A1 | 10/2014 |
| WO | 0073811 A1 | 12/2000 |

OTHER PUBLICATIONS

European Patent Office, Office Action Issued in Application No. 22722760.0, Feb. 27, 2025, Germany, 4 pages.
IP Australia, Office Action Issued in Application No. 2022260409, Dec. 2, 2024, 5 pages.
IP Australia, Office Action and Search Report Issued in Application No. 2022260409, Jul. 7, 2025, 3 pages.
IP Australia, Office Action and Search Report Issued in Application No. 2022260409, Sep. 11, 2025, 5 pages.
"Boomerang (countermeasure)," Wikipedia, Available Online at https://en.wikipedia.org/w/index.php?title=Boomerang_(countermeasure)&oldid=1009736328, Version from Mar. 2, 2021, 3 pages.

* cited by examiner

DEVICE, METHOD AND VEHICLE

FIELD

The present invention relates to a device for determining a firing position from which a projectile has been fired at a target, a corresponding method and a vehicle which is equipped with such a device.

BACKGROUND

Military vehicles are often being attacked from hidden positions. Sensor arrangements are known which detect a pressure wave from missed projectiles which do not hit the vehicle but fly past it, wherein a trajectory of the projectile may be determined using several sensors on the basis of a difference in the time of flight of the determination of the pressure wave. Based on the trajectory, the direction or position from which the projectile was fired may be determined.

If the projectile hits the vehicle, neither the position may be determined in this way, nor it may be determined that the vehicle was fired on at all, since the pressure wave of the projectile necessary for the determination is not being detected.

In view thereof, it is an object of the present invention to provide an improved device for determining a firing position from which a projectile has been fired at a target object.

SUMMARY

According to a first aspect, a device for determining a firing position from which a projectile has been fired at a target object is proposed. The device comprises:
- at least one sensor unit for detecting an impact of the projectile on the target object,
- at least one acoustic sensor unit for detecting a muzzle blast upon firing the projectile, and
- a determination unit which is arranged to determine the firing position on the basis of the detected muzzle blast and the detected impact.

This device has the advantage that it may be determined that a firing and a hit on the target object has taken place, and that it may additionally be determined from where the target object was fired at. This allows effective defensive measures to be taken on the part of the target object.

The target object is in particular a military vehicle, which is operated by a crew of one or more soldiers, for example. For the crew, it may be essential for survival that the firing position from which the vehicle with its crew is taken under fire is known. The proposed device may advantageously inform the crew of this and may enable them to react appropriately to the threat.

For use in the field, the device is in particular attached to or arranged on the target object. This means that the various sensor units are suitably arranged on the target object. In this case, the determination unit may also be integrated as part of a central control system of the target object.

The sensor unit for detecting the impact of the projectile in the target object comprises, for example, a structure-borne sound sensor which is arranged to detect longitudinal and/or transverse sound waves which propagate in the target object, in particular in a solid outer skin of the target object, such as armor or the like. In particular, the sensor unit has a sensitivity that makes it possible to detect impacts from small-caliber weapons, which is weapons having a caliber of approximately 5 mm or more. Such projectiles have a kinetic energy of 50 joules or more, for example. In the following, it may be referred to in short as the impact sensor unit.

The acoustic sensor unit for detecting the muzzle blast upon firing of the projectile comprises at least one microphone. Preferably, the acoustic sensor unit comprises several microphones which are aligned towards different directions. The different alignment of the microphones makes it possible to determine the direction from which a sound wave is incident on the acoustic sensor unit by determining differences in the reception level of the multiple microphones and/or differences in propagation time.

In particular, the impact sensor unit and the acoustic sensor unit each output a sensor signal to the determination unit. This sensor signal may be an analogue voltage signal, but it may also be a pre-processed digital data signal.

In embodiments, the impact sensor unit and the acoustic sensor unit are arranged in a common housing, and/or are controlled and operated via a common integrated circuit.

The impact sensor unit may, for example, output a signal pattern of the detected impact as a sensor signal. The signal pattern may comprise information regarding a propagation path of the structure-borne sound from the impact position to the respective sensor unit, which is why the impact position may be deduced from the signal pattern, for example. This information may be taken into account upon the determination of the firing position.

The determination unit is arranged to determine the firing position on the basis of the detected muzzle blast and the detected impact. For this purpose, the determination unit in particular performs a sensor fusion in which the different information that is being detected and provided by the different sensor units is jointly considered and evaluated. In this way, the determination unit may be arranged in particular to take into account correlations between the sensor signals that would not be necessary if the individual sensor signals were processed independently. Furthermore, the determination unit may be adapted in such a way to take into account sensor signals from a larger number of sensor units.

The determination unit may be implemented in hardware and/or in software. In a hardware implementation, the unit may be designed as a device or as part of a device, for example as a computer or as a microprocessor. In a software implementation, the unit may be designed as a computer program product, a function, a routine, part of a program code or an executable object.

A computer program product, such as a computer program means, may be provided or delivered as a storage medium, such as a memory card, USB stick, CD-ROM, DVD, or even in the form of a downloadable file from a server on a network. This may be carried out, for example, in a wireless communication network by transmitting a corresponding file with the computer program product or the computer program means.

In particular, it may be said that the determination unit performs the determination of an impact and a positioning. First, the impact sensor unit determines on the basis of the sensor signal whether an impact of a projectile has occurred. For this purpose, an amplitude, a rate of change and/or a frequency analysis of the sensor signal is carried out, for example. If an impact has been detected, a positioning is performed on the basis of the sensor signal of the impact sensor unit and on the basis of the sensor signal of the acoustic sensor unit, the result of which is the position of the barrel weapon that fired the projectile. It should be noted that the impact of the projectile is usually detected in time before the muzzle blast, since the projectile is usually faster than the speed of sound in air.

The accuracy of the positioning depends in particular on how many acoustic sensor units the device comprises. Particularly advantageously, the device comprises at least three acoustic sensor units, which are arranged with the greatest possible distance from each other on the target object. In the case of several acoustic sensor units, the firing position may be determined by means of multilateration, in particular on the basis of runtime differences between the several sensor units.

Furthermore, environmental conditions, such as air temperature, air humidity, wind direction and wind speed and/or air stratification, may be taken into account during positioning.

The result of the positioning is the firing position, which comprises, for example, a directional indication comprising an azimuth angle and a distance of the firing position from the target. The direction indication may optionally additionally comprise an elevation angle.

According to one embodiment, the determination unit is arranged to determine, on the basis of the detected muzzle blast and the detected impact, a hit position comprising a position of impact of the projectile in the target object.

The hit position indicates, for example, that the projectile has hit the target object in a front area, a rear area, a left side and/or a right side.

According to a further embodiment of the device, the muzzle blast is characterized by a certain sound level incoming to the device from a particular direction.

According to a further embodiment of the device, the device comprises at least two acoustic sensor units for detecting the muzzle blast.

According to a further embodiment of the device, the device comprises at least two sensor units for detecting the impact of the projectile in the target object, wherein the determination unit is further arranged to determine, on the basis of a difference of the respective determination of the impact by the at least two sensor units, a hit position comprising a position of the impact of the projectile in the target object.

The difference in determination is understood to be a difference in the at least two sensor signals output by the at least two sensor units. The difference may comprise a time of determination but may also comprise a difference in a signal pattern or the like.

According to a further embodiment of the device, the acoustic sensor unit is further arranged to detect a pressure wave of the projectile when the projectile flies past the sensor unit, wherein the determination unit is further arranged to determine the firing position additionally on the basis of the detected pressure wave.

This embodiment is advantageous if, for example, the projectile flies past the acoustic sensor unit before impact, because then the pressure wave of the projectile is additionally detected and taken into account upon determination of the firing position. Whether this is the case depends on the position of the acoustic sensor unit, the hit position and the firing position.

According to a further embodiment of the device, the sensor unit for detecting the impact of the projectile comprises a structure-borne sound detector.

According to a further embodiment of the device, the muzzle blast comprises a specific sound pattern characteristic of the barrel weapon firing the projectile, wherein the determination unit is further arranged to detect a type of the barrel weapon that fired the projectile.

The sound pattern is received by the acoustic sensor unit and is also output as a sensor signal. The sound pattern may be used in particular to determine the type of barrel weapon. This may be done, for example, by comparing the received sound pattern with a database of sound patterns for different barrel weapons. Based on a distortion of the received sound pattern, the firing position, in particular a distance between the firing position and the target object, may be determined more precisely.

Upon determination the type of the barrel weapon, the sensor signal of the impact sensor unit may also be taken into account, from which, for example, a kinetic energy of the projectile may be derived, which gives an indication of a mass and/or a caliber and/or a velocity of the projectile, wherein the types of barrel weapon in question may be confined.

According to a further embodiment of the device, the device comprises an output unit for outputting the determined firing position.

The determined firing position is output, for example, to a central control system of the target, to a command and control system and/or to a soldier information system or the like.

According to a second aspect, a method for determining a firing position from which a projectile has been fired at a target object is proposed. The method comprises the following steps:

detecting an impact of the projectile in the target object,
detecting a muzzle blast upon firing the projectile, and
determining the firing position based on the detected muzzle blast and the detected impact.

The embodiments and features described with respect to the device of the first aspect apply to the proposed method accordingly.

According to a third aspect, a vehicle, in particular a military vehicle, having a device according to the first aspect or according to one of the embodiments of the first aspect is proposed.

Here, the vehicle constitutes the target object according to the first aspect.

According to one embodiment, the vehicle is configured as an armored vehicle, in particular a tracked vehicle or a wheeled tank, a flying object, in particular an aircraft, a helicopter or a drone, and/or as a watercraft.

The sensor unit for detecting the impact of the projectile is in particular arranged in or on an armoring of the vehicle. The armoring comprises, for example, solid materials, such as steel, which properly transmit a structure-borne sound, such as that caused by the impact of the projectile in the armoring.

According to a further embodiment of the vehicle, the device comprises at least two acoustic sensor units arranged at opposite positions on the vehicle.

The term "opposite positions" is understood in particular such that the acoustic sensor units are arranged at the greatest possible distance from each other on the vehicle, as this may improve an accuracy of the position determination.

Preferably, the acoustic sensor units are also arranged in such a way that they are essentially not covered or shadowed by other superstructures of the vehicle in one hemisphere, such that sound waves from this hemisphere reach the acoustic sensor unit essentially unattenuated.

According to a further embodiment of the vehicle, the device comprises at least two sensor units for detecting the impact of the projectile in the vehicle, which sensor units are arranged at opposite positions on the vehicle.

Further possible implementations of the invention also comprise combinations of features or embodiments described above or below with respect to the exemplary embodiments that are not explicitly mentioned. In this context, the skilled person will also add individual aspects as improvements or additions to the respective basic embodiment of the invention.

Further advantageous embodiments and aspects of the invention are the subject of the dependent claims, as well as of the exemplary embodiments of the invention described below. In the following, the invention will be explained in more detail by means of preferred embodiments with reference to the accompanying figures.

Furthermore, the invention will be explained in more detail by means of preferred embodiments with reference to the accompanying figures.

BRIEF DESCRIPTION OF THE DRAWINGS

In the Figures, identical or functionally identical elements have been given the same reference signs unless otherwise indicated.

DETAILED DESCRIPTION

Figure 1:
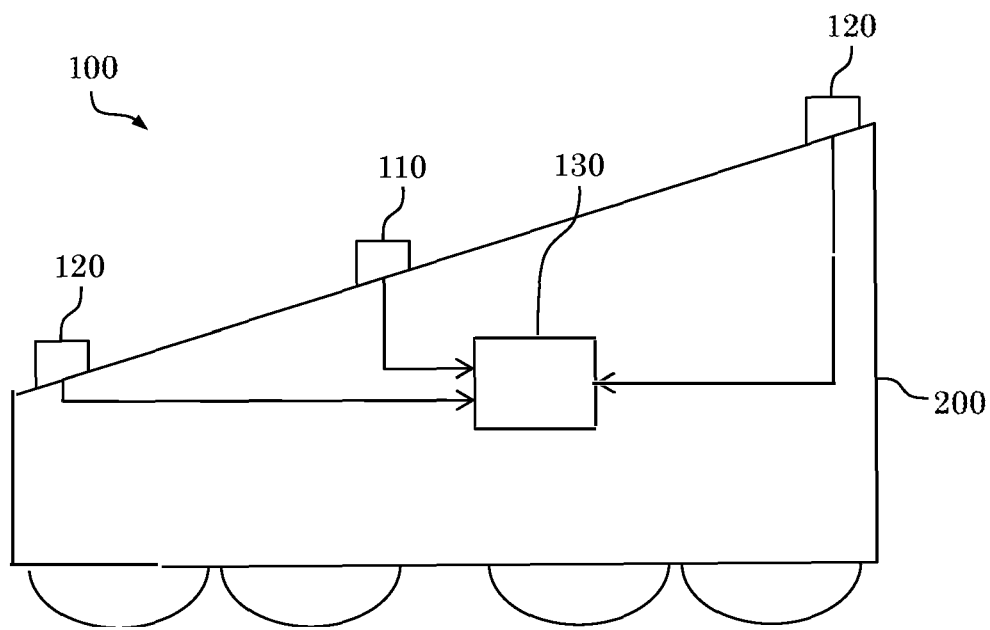
FIG. 1 represents a schematic view of a first embodiment of a vehicle including a device for determining a firing position.
Figure 2:
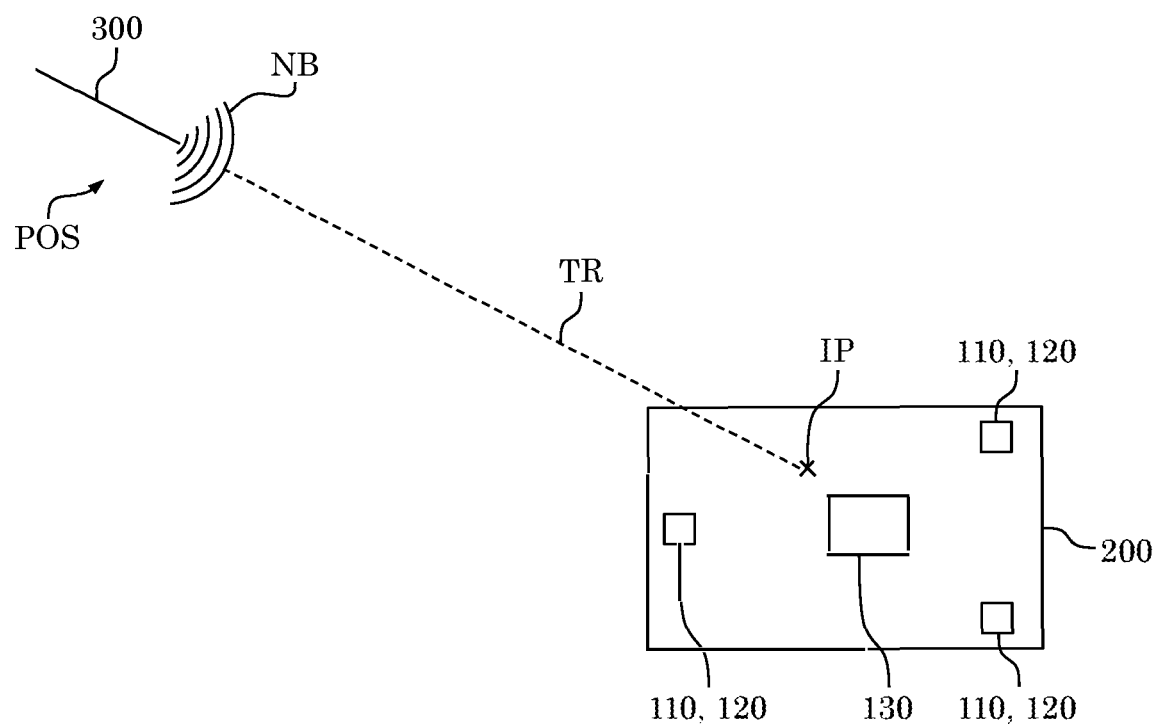
FIG. 2 represents a schematic view of a firing of a vehicle including a device for determining a firing position.
Figure 3:
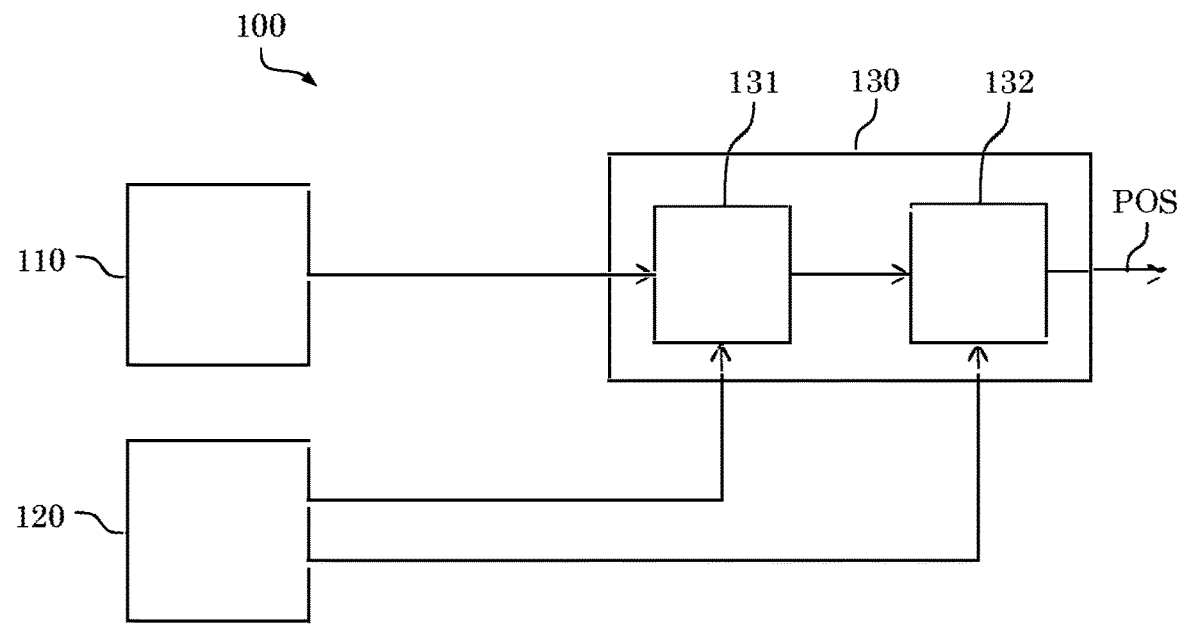
FIG. 3 represents a schematic block diagram of an embodiment of a device for determining a firing position.

FIG. 1 shows a schematic view of a first embodiment of a vehicle 200 including a device 100 for determining a firing position POS (see FIG. 2 or 3). In this example, the vehicle 200 is a wheeled armored vehicle. In this example, the device 100 comprises a sensor unit 110 for detecting an impact IP (see FIG. 2) of a projectile in the vehicle 200 and two acoustic sensor units 120, each of which is arranged to detect a muzzle blast NB (see FIG. 2) generated when the projectile is fired. In addition, the device 100 comprises a determination unit 130, which is arranged to determine the firing position POS on the basis of the detected muzzle blast NB and the detected impact IP.

For example, all three sensor units 110, 120 shown here output a respective sensor signal to the determination unit 130. The determination unit 130 performs a sensor fusion in order to determine the firing position POS taking into account all received sensor signals. The determination of the firing position POS is explained in detail below with reference to FIGS. 2 and 3.

FIG. 2 shows a schematic view of a vehicle 200 being fired at with a device 100 for determining a firing position POS. The vehicle 200 is, for example, the wheeled tank of FIG. 1. In this example, the device 100 comprises, in addition to the determination unit 130, a total of three combined sensors 110, 120, each of the three sensors comprising an impact sensor unit 110 and an acoustic sensor unit 120. The respective acoustic sensor unit 120 comprises in particular five microphones, the respective sensitive membrane of which is oriented in different directions. For example, the five microphones are arranged on five sides of a cube, wherein a surface normal of the respective sides of the cube represents the main reception direction for the respective microphone. The respective impact sensor unit 110 comprises a respective structure-borne sound sensor which is arranged, for example, directly on the armor of the vehicle 200. In the present example, the three combined sensor units 110, 120 form a triangle, wherein the respective sensor units 110, 120 are arranged close to a side flank of the vehicle 200. In this way, the sensor units 110, 120 are arranged on the vehicle as far away from each other as possible, which enables a more precise positioning of the firing position POS as compared to a case where the sensor units 110, 120 would be positioned closer together.

A pipe weapon 300 is schematically shown at a position POS remote from the vehicle 200. This is, for example, a sniper with a sniper rifle. The sniper fires a shot at the vehicle 200 with his rifle 300. When the projectile exits the barrel of the rifle 300, the highly pressurized gases of the propellant charge for the projectile escape from the barrel and form the muzzle blast NB. The trajectory TR of the projectile is shown in dashed lines. The projectile hits the vehicle 200, and impacts therein at the position IP.

The impact of the projectile causes a propagation of structure-borne sound in the vehicle 200, which is detected by the impact sensor units 110. In this case, a hit position of the impact may be determined with high accuracy based on the three independent sensor signals.

In this example, the acoustic sensor unit 120 closest to the firing position POS may detect a pressure wave resulting from the projectile flying past the sensor unit 120. However, this is not mandatory to determine the firing position POS, but may be helpful and may lead to a higher accuracy.

The three acoustic sensor units 120 each detect the muzzle blast NB. This results in a difference in the time of determination of the muzzle blast NB for the different sensor units 120 (difference in time of flight). Based on this difference, a multilateration may be carried out, the result of which is the firing position POS. The firing position POS is determined at least with an azimuth angle and a distance, where the azimuth angle refers to, for example, a current direction of travel of the vehicle 200.

In this example, the direction in which the firing position POS lies may already be deduced from each individual sensor signal of the acoustic sensor units 120, since the several microphones of a respective sensor unit 120 detect the muzzle blast NB differently, in particular with a different sound level. This individual directional information in the determination of the firing position POS by the determination unit 130 may be additionally taken into account in order to determine the firing position POS with even higher accuracy.

It should be noted that the device 100 is not limited to operation with land vehicles, such as armored vehicles, in particular tracked or wheeled tanks, but may also be used with air vehicles, such as helicopters, aircraft or drones, or water vehicles, such as speedboats, ships or the like.

FIG. 3 shows a schematic block diagram of an exemplary embodiment for a device 100 for determining a firing position POS. In this example, the device 100 comprises only an impact sensor unit 110 and an acoustic sensor unit 120, but this is not to be construed restrictively. The device 100 further comprises a determination unit 130, which in this example comprises two blocks 131, 132, wherein the block 131 performs an impact determination, and wherein the block 132 performs a positioning.

As already explained with reference to FIG. 2, the impact sensor unit 110 outputs a sensor signal to the determination unit 130 when it determines an impact IB (see FIG. 2). If the acoustic sensor unit 120 detects a pressure wave of the projectile, as described with reference to FIG. 2, then it also outputs a corresponding sensor signal to the determination unit 130.

In the determination unit 130, an impact determination is now first carried out in block 131. If an impact is determined on the basis of the received sensor signals, a positioning of the firing position POS is carried out in block 132. Information from the impact determination that limits the possible firing position POS is also taken into account. For example, the impact determination may include a determination of the hit position. From the geometry of the vehicle 200 (see FIG. 1 or FIG. 2) and the hit position, certain areas may already be excluded for the firing position POS. If a pressure wave of the projectile has also been detected, the direction of the firing position may be narrowed down even more precisely. The positioning of the firing position POS is thus based both on the detected muzzle blast NB, which is detected by the acoustic sensor unit 120 and output to the determination unit 130, and on the detected impact of the projectile in the vehicle 200.

The proposed device 100 thus provides the advantage of being able to alert both with respect to an impact of a projectile having taken place and with respect to the firing position POS from which the projectile was fired.

Figure 4:
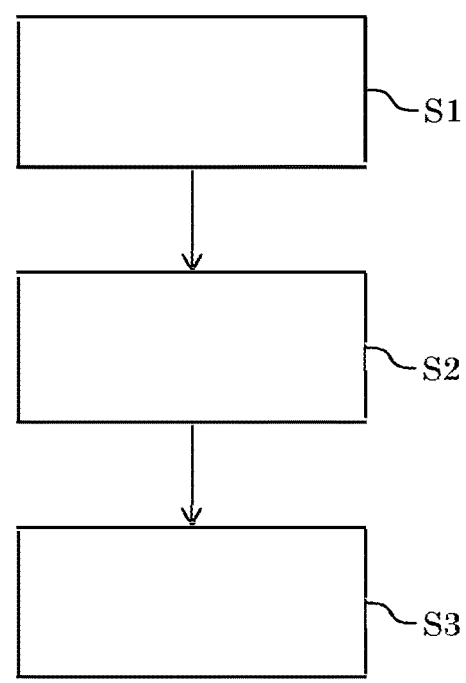
FIG. 4 represents a schematic block diagram of an embodiment of a method for determining a firing position.

FIG. 4 shows a schematic block diagram of an exemplary embodiment of a method for determining a firing position POS (see FIG. 2) from which a projectile was fired at a target object 200 (see FIG. 1 or FIG. 2). In a first step S1, an impact IP (see FIG. 2) of the projectile in the target object 200 is being detected. In a second step S2, a muzzle blast NB (see FIG. 2) is being detected upon firing the projectile. In a third step S3, the firing position POS is being determined based on the detected muzzle blast NB and the detected impact IP.

Although the present invention has been described on the basis of exemplary embodiments, the present invention may be modified in many ways.

Reference Characters List

| | |
|---|---|
| 100 | device |
| 110 | sensor unit |
| 120 | sensor unit |
| 130 | determination unit |
| 131 | impact determination |
| 132 | positioning |
| 200 | vehicle |
| 300 | pipe weapon |
| IP | impact |
| NB | muzzle blast |
| POS | firing position |
| S1 | process step |
| S2 | process step |
| S3 | process step |
| TR | trajectory |

The invention claimed is:

1. A device for determining a firing position from which a projectile has been fired at a target object, comprising:
an impact sensor unit for detecting an impact of the projectile in the target object;
an acoustic sensor unit for detecting a muzzle blast when the projectile is fired; and
a determination unit for determining the firing position on the basis of the detected muzzle blast and the detected impact, wherein
the impact sensor unit comprises a structure-borne sound detector for detecting the impact of the projectile,
a sensitivity of the impact sensor unit is configured to detect the impact of the projectile fired from a weapon having a caliber equal to or greater than 5 mm, the projectile having a kinetic energy of 50 joules or more,
the acoustic sensor unit additionally detects a pressure wave of the projectile when the projectile passes the impact sensor unit, and
the determination unit additionally determines the firing position based on the detected pressure wave.

2. The device according to claim 1, wherein
the determination unit additionally determines, on the basis of the detected muzzle blast and the detected impact, a hit position comprising a position of the impact of the projectile in the target object.

3. The device according to claim 1, wherein
the muzzle blast is characterized by a certain sound level incoming to the device from a certain direction.

4. The device according to claim 1, wherein
the device comprises at least two acoustic sensor units for detecting the muzzle blast.

5. The device according to claim 1, wherein
the device comprises at least two impact sensor units for detecting the impact of the projectile in the target object, and
the determination unit additionally determines a hit position comprising a position of the impact of the projectile in the target object on the basis of a difference of the respective detection of the impact by the at least two impact sensor units.

6. The device according to claim 1, wherein
the launch position comprises a directional indication comprising an azimuth angle and optionally in addition an elevation angle and a distance of the launch position from the target object.

7. The device according to claim 1, wherein
the muzzle blast comprises a specific sound pattern characteristic of a pipe weapon firing the projectile, wherein the determination unit is further adapted to determine a type of the pipe weapon that fired the projectile in dependence on the sound pattern.

8. The device according to claim 1, further comprising:
an output unit for outputting the determined firing position.

9. A method for determining a firing position from which a projectile has been fired at a target object, comprising:
detecting, by an impact sensor unit, an impact of the projectile in the target object;
detecting, by an acoustic sensor unit a muzzle blast when the projectile is fired; and
determining, by a determination unit, the firing position on the basis of the detected muzzle blast and the detected impact, wherein
the impact sensor unit comprises a structure-borne sound detector for detecting the impact of the projectile,
a sensitivity of the impact sensor unit is configured to detect the impact of the projectile fired from a weapon having a caliber equal to or greater than 5 mm, the projectile having a kinetic energy of 50 joules or more,
the acoustic sensor unit additionally detects a pressure wave of the projectile when the projectile passes the impact sensor unit, and
the determination unit additionally determines the firing position based on the detected pressure wave.

10. The device according to claim 1, wherein
the device is mounted in an armored vehicle.

11. The device according to claim 10, wherein
the armored vehicle is a tracked vehicle or a wheeled tank.

12. The device according to claim 10, wherein
the acoustic sensor unit is a first acoustic sensor unit, and the device further comprises a second acoustic sensor unit, the first and second acoustic sensor units being arranged at opposite positions on the armored vehicle from one another in a front-rear direction.

13. The device according to claim 10, wherein the impact sensor unit is a first impact sensor unit, and the device further comprises a second impact sensor unit, the first and second impact sensor units being arranged at opposite positions on the armored vehicle from one another in a front-rear direction.

14. The device according to claim 12, wherein, the armored vehicle is an aircraft, a helicopter, or a drone.

15. The device according to claim 10, wherein the armored vehicle is a watercraft.

16. The device according to claim 10, wherein the acoustic sensor unit is a first acoustic sensor unit, and the device further comprises a second acoustic sensor unit, the first and second acoustic sensor units being arranged at opposite positions on the armored vehicle from one another in a left-right direction.

17. The device according to claim 10, wherein the impact sensor unit is a first impact sensor unit, and the device further comprises a second impact sensor unit, the first and second impact sensor units being arranged at opposite positions on the armored vehicle from one another in a left-right direction.

18. The device according to claim 16, wherein the device further comprises a third acoustic sensor unit arranged at an opposite position on the armored vehicle from the first and second acoustic sensor units in a front-rear direction.

19. The device according to claim 17, wherein the device further comprises a third impact sensor unit arranged at an opposite position on the armored vehicle from the first and second impact sensor units in a front-rear direction.

* * * * *